US006996045B1

(12) United States Patent
Sumi et al.

(10) Patent No.: US 6,996,045 B1
(45) Date of Patent: Feb. 7, 2006

(54) OPTICAL DISK CONTROLLER WHICH SETS SAMPLING INTERVAL ACCORDING TO ROTATIONAL SPEED OF OPTICAL DISK

(75) Inventors: Fumio Sumi, Osaka (JP); Yoshiyuki Iwamura, Osaka (JP); Noriyuki Manabe, Osaka (JP); Hiroshi Sakamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/538,513

(22) Filed: Mar. 30, 2000

(30) Foreign Application Priority Data

Mar. 31, 1999 (JP) ................................ 11-092566

(51) Int. Cl.
G11B 20/18 (2006.01)
(52) U.S. Cl. ................ 369/53.3; 369/54.41; 369/54.42
(58) Field of Classification Search ............. 369/53.18, 369/116, 29.01, 53.41, 53.42, 53.44, 106, 369/13.02, 44.28, 30.16, 53.12, 53.25, 53.3, 369/53.35, 53.37; 710/15, 17–19
See application file for complete search history.

(56) References Cited

U.S. PATENT DOCUMENTS

| | | | | |
|---|---|---|---|---|
| 5,087,997 A | * | 2/1992 | Osada et al. .............. | 369/59.22 |
| 5,155,716 A | * | 10/1992 | Imanaka et al. ......... | 369/44.32 |
| 5,422,890 A | * | 6/1995 | Klingsporn et al. ........ | 714/723 |
| 5,511,052 A | * | 4/1996 | Perry ...................... | 369/44.34 |
| 5,521,893 A | | 5/1996 | Yamasaki et al. | |
| 5,539,590 A | | 7/1996 | Tateishi | |
| 5,878,009 A | * | 3/1999 | Hayashi ...................... | 345/751 |
| 6,122,235 A | * | 9/2000 | Arai ........................ | 369/53.35 |
| 6,141,306 A | * | 10/2000 | Andoh ...................... | 348/478 |
| 6,414,921 B1 | * | 7/2002 | Kim ........................ | 369/47.44 |
| 6,467,054 B1 | * | 10/2002 | Lenny ........................ | 714/42 |
| 6,493,656 B1 | * | 12/2002 | Houston et al. ............ | 702/187 |

FOREIGN PATENT DOCUMENTS

| | | |
|---|---|---|
| EP | 0 241 081 A1 | 10/1987 |
| EP | 0 469 553 A1 | 2/1992 |
| JP | 51-028448 | 10/1976 |
| JP | 63071755 | 4/1988 |
| JP | 3-228262 | 10/1991 |
| JP | 4-1972 | 1/1992 |

OTHER PUBLICATIONS

"Input/Output Operation Asynchronous Status Reporting Technique." IBM Technical Disclosure Bulletin, vol. 29, No. 8, Jan. 1, 1987, pp. 3573-3576, XP002266124.

* cited by examiner

*Primary Examiner*—Aristotelis M Psitos
(74) *Attorney, Agent, or Firm*—McDermott Will & Emery LLP (57) ABSTRACT

The optical disk controller of this invention that reduces the frequency of output of status reports to relieve the burden of a system controller includes: a status generator for generating status reports each representing the operation state of the optical disk controller every sector of a disk; and a status sampling section for sampling the status reports at a set sampling interval. When a generated status report matches with "sampling abort" status stored in a sampling category storing portion, status sampling is aborted.

12 Claims, 11 Drawing Sheets

| Command | Auxiliary information |
|---|---|
| READ | Sector to be read, Buffer page, Error upper limit, Execution stop condition, Correction condition |
| TRANSFER TO HOST | Buffer page, Sector ID |
| SAMPLING DESIGNATION | Start/end |
| SAMPLING STATUS DESIGNATION | Factor, "Sampling abort" or "Forced sampling" |
| ODC OPERATION MODE | For audio/video reproduction or for data read/write |

Fig. 3a

For audio/video reproduction (DVD players, CD players)

| Information category | Factor | Auxiliary information |
|---|---|---|
| Continued | Normal | |
| | Data category changed | Sector to be read, Category information |
| | Sector discontinued | |
| | Error rate increased | |
| | Correction not permitted | Sector to be read, Buffer page |
| Aborted due to error | Buffer full | Sector to be read, Buffer page |
| | Sector undetected | |
| Normally ended | | |

Fig. 3b

For data read/write (DVD-ROM drives, CD-ROM drives)

| Information category | Factor | Auxiliary information |
|---|---|---|
| Continued | Normal | |
| | Data category changed | Sector to be read, Category information |
| | Sector discontinued | |
| | Error rate increased | |
| Aborted due to error | Correction not permitted | Sector to be read, Buffer page |
| | Buffer full | Sector to be read, Buffer page |
| | Sector undetected | |
| Normally ended | | |

| Sector | Factor |
|---|---|
| 7 5 0 | Normal |
| 7 5 1 | Normal |
| 7 5 2 | Data category changed |
| 7 5 3 | Normal |
| 7 5 4 | Normal |
| 7 5 6 | Sector discontinued |
| 7 5 7 | Normal |
| 7 5 8 | Normal |

| Factor | Designated sampling operation |
|---|---|
| Sector discontinued | Sampling abort |
| Error rate increased | Sampling target |
| Correction not permitted | Sampling target |
| Data category changed | Forced sampling |
| Others | Sampling target |

Fig. 9

| Information category | Factor | Auxiliary information | |
|---|---|---|---|
| Continued | Normal | 7 5 0 | 1 0 |
| Continued | Data category changed | 7 5 2 | 1 2 |
| Continued | Sector discontinued | 7 5 6 | 1 5 |
| Continued | Normal | 7 5 7 | 1 6 |
| Normally ended | Normal | 7 5 8 | 1 7 |

| Information category | Factor | Auxiliary information | |
|---|---|---|---|
| | | <Sector ID> | <Buffer page> |
| Continued | Normal | 7 5 0 | 1 0 |
| Continued | Normal | 7 5 1 | 1 1 |
| Continued | Data category changed | 7 5 2 | 1 2 |
| Continued | Normal | 7 5 3 | 1 3 |
| Continued | Normal | 7 5 4 | 1 4 |
| Continued | Sector discontinued | 7 5 6 | 1 5 |
| Continued | Normal | 7 5 7 | 1 6 |
| Normally ended | Normal | 7 5 8 | 1 7 |

OPTICAL DISK CONTROLLER WHICH SETS SAMPLING INTERVAL ACCORDING TO ROTATIONAL SPEED OF OPTICAL DISK

BACKGROUND OF THE INVENTION

The present invention relates to an optical disk controller that performs processing such as modulation on a signal obtained from a pickup by reading data recorded on an optical disk.

In recent years, development of optical disk devices for DVD-ROMs, DVD-RAMs, in succession to those for CD-ROMs, has made progress. Many of such optical disk devices are implemented by the combination of an optical disk controller that performs a series of data processing including modulation, error correction, buffering, and transfer to host and a system controller that controls components of the optical disk device such as a pickup and a servo.

Figure 10:
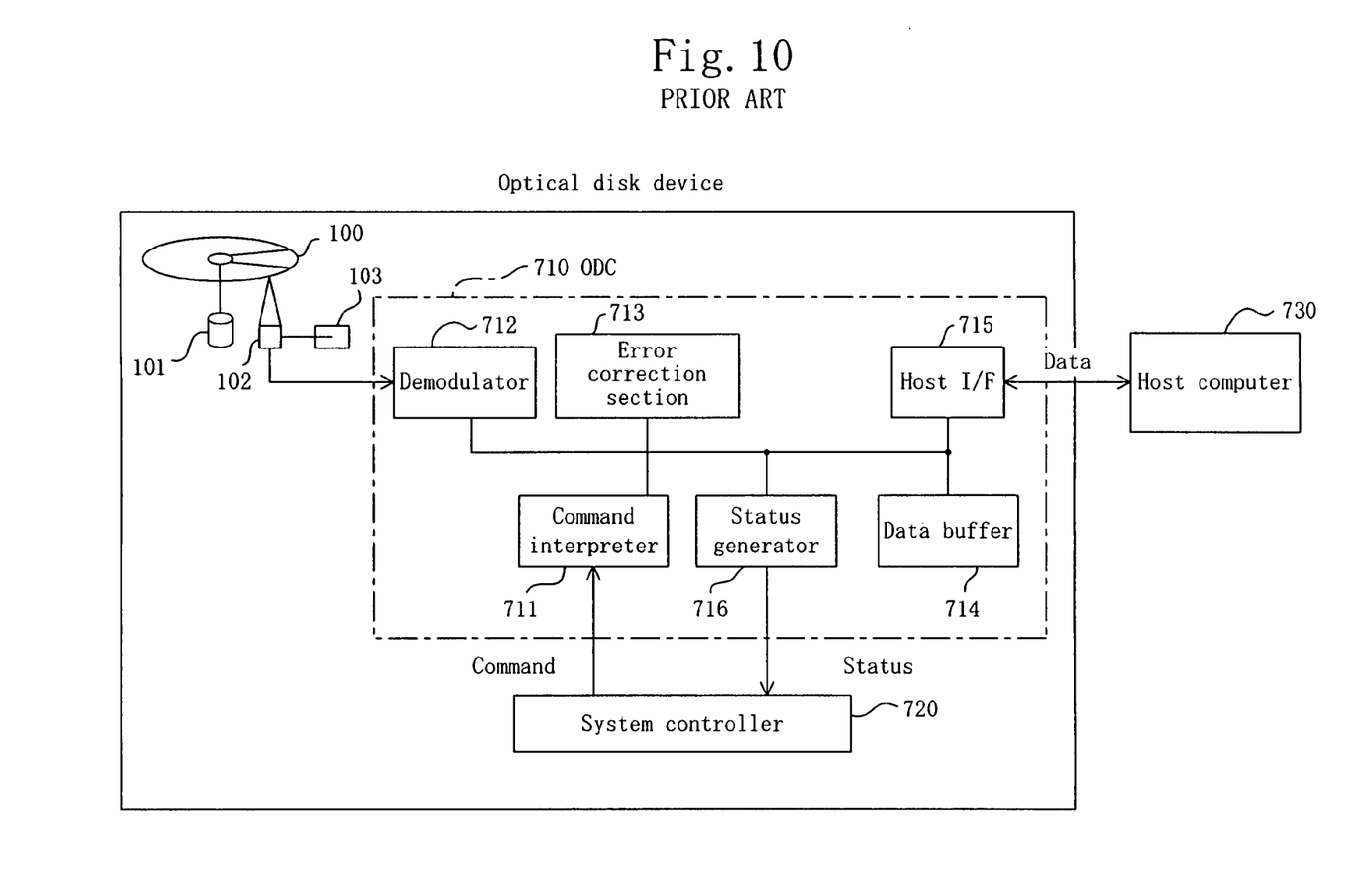
FIG. 10 is a view showing the construction of an optical disk device including a conventional optical disk controller.

FIG. 10 shows an optical disk device including a conventional optical disk controller. Referring to FIG. 10, the optical disk device includes: a spindle motor 101 for rotating an optical disk 100; a pickup 102 for reading data from the optical disk 100 by radiating the optical disk 100 with laser light; a servo 103 for positioning the pickup 102; an optical disk controller (ODC) 710 for performing signal processing; and a system controller 720 for controlling the operation of the entire system.

The optical disk controller 710 includes a command interpreter 711, a demodulator 712, an error correction section 713, a data buffer 714, a host interface 715, and a status generator 716.

A host PC 730 sends a command to the optical disk device requesting data read from the optical disk 100. On receipt of the data read command via the host interface 715, the system controller 720 controls the spindle motor 101 to rotate the optical disk 100 and the servo 103 to move the pickup 102 to a target sector. The system controller 720 then issues command READ to the optical disk controller 710.

On receipt of the command READ, the command interpreter 711 instructs the demodulator 712 to read specified sectors. The demodulator 712 monitors data read by the pickup 702 and, when recognizing data of a head sector, sends the data of the sector to the error correction section 713. The error correction section 713 executes error correction for the data output from the demodulator 712. The error-corrected data is then temporarily stored in the data buffer 714.

Figure 11:
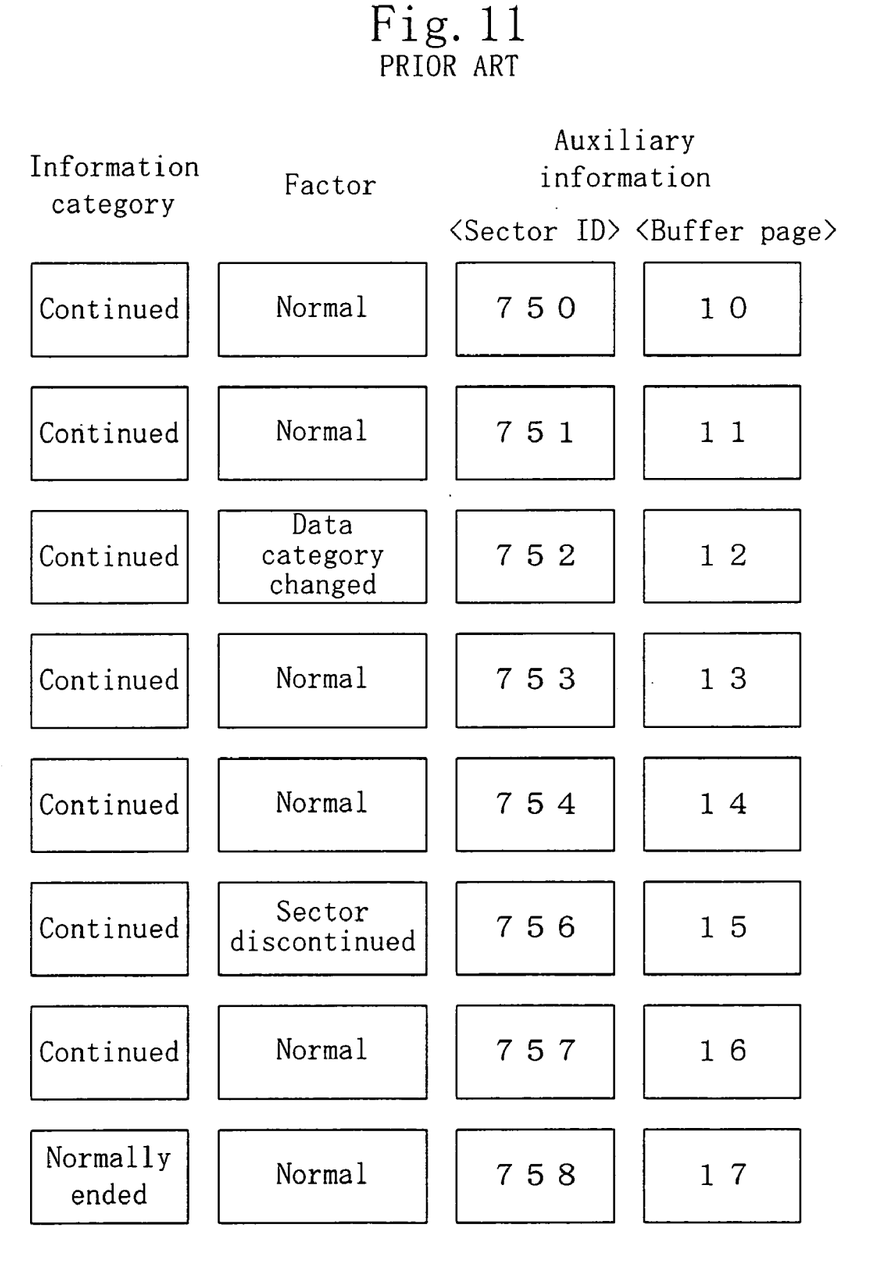
FIG. 11 shows an example of conventional status report output results.

The status generator 716 generates a status report or "status" for the data based on the error correction results received from the error correction section 713. FIG. 11 shows examples of generated status reports, each of which is composed of items of information category, factor, and auxiliary information. The information category indicates whether the issued command was "continued", "normally ended", or "abnormally ended". The factor indicates the state of the current sector. If any problem arises, information on the problem is added to this item. The auxiliary information includes the current sector ID and the buffer page number on which the error-corrected data has been stored.

The status generator 716 generates a status report every time data of each sector is read, and outputs the results to the system controller 720. The factor of the status report is "normal" for the sector of which data has been normally corrected. For the sector of which data has failed to be normally read during reading of the sector, the factor of the status report includes relevant information, so that the system controller 720 is notified of the information.

Thus, the optical disk controller 710 generates the status report representative of the inner state thereof every error correction, thereby enabling the system controller 720 to keep track of the operation of the optical disk controller 710. Based on the status report received, the system controller 720 can determine whether read operation be continued or aborted. In this way, proper read processing is realized.

In optical disk devices, one of factors for determining drive performance is the rotational speed of the disk. As the rotational speed of the disk is higher, the data read/write time is shorter and the data processing size per unit time is greater. Therefore, nowadays, operation at a higher rotational speed is requested for optical disk devices.

In the conventional status report output procedure, as the rotational speed of the disk is higher, the period of status report output becomes shorter. This reduces the time allowance given for determining whether the processing be continued or aborted based on a received status report after the status report is received. Consequently, as the rotational speed of the disk increases, the burden of the system controller becomes excessively large.

SUMMARY OF THE INVENTION

An object of the present invention is providing an optical disk controller that reduces the frequency of output of status reports to relieve the burden of a system controller.

Concretely, the optical disk controller for performing signal processing for an optical disk according to the present invention includes: a status generator for generating status reports each representing the operation state of the optical disk controller; and a status sampling section for sampling the status reports.

According to the invention, the status reports generated by the status generator are sampled by the status sampling section. By this sampling, the frequency of output of status reports becomes lower than the frequency of generation of status reports, resulting in relieving the burden of a system controller that performs processing for the respective status reports.

Preferably, the status sampling section includes a sampling interval setting portion for setting a status sampling interval.

Preferably, also, the sampling interval setting portion sets the sampling interval according to the rotational speed of the optical disk. By this setting of the sampling interval according to the rotational speed of the optical disk, the burden of the system controller that performs processing for the respective status reports is avoided from increasing even when the rotational speed of the optical disk is enhanced.

Preferably, the sampling interval setting portion determines the rotational speed of the optical disk according to a synchronization period of a signal demodulated from the optical disk.

The optical disk controller may further includes assigning means for allowing the sampling interval setting portion to set the sampling interval according to a command input externally.

Preferably, the sampling interval setting portion sets the sampling interval according to an error rate of a signal demodulated from the optical disk.

The status sampling section preferably includes a sampling category storing portion that stores "sampling abort" status indicating that sampling operation should be aborted, and, when the status report generated by the status generator matches with the "sampling abort" status stored in the sampling category storing portion, the sampling is aborted.

The status sampling section preferably includes a sampling category storing portion that stores "forced sampling" status indicating that the status report should be output even during sampling operation, and, when the status report generated by the status generator matches with the "forced sampling" status stored in the sampling category storing portion, the status report is output even during sampling operation.

The optical disk controller may further include assigning means for setting sampling category information representing the relationship between a factor in the status report and sampling operation and storing the sampling category information in the sampling category storing portion. The status sampling section may update the sampling category information stored in the sampling category storing portion according to a signal demodulated from the optical disk.

It is also an object of the present invention to provide an optical disk device that includes the optical disk controller according to the present invention.

DESCRIPTION OF THE PREFERRED EMBODIMENTS

Hereinafter, preferred embodiments of the present invention will be described with reference to the accompanying drawings.

Figure 1:
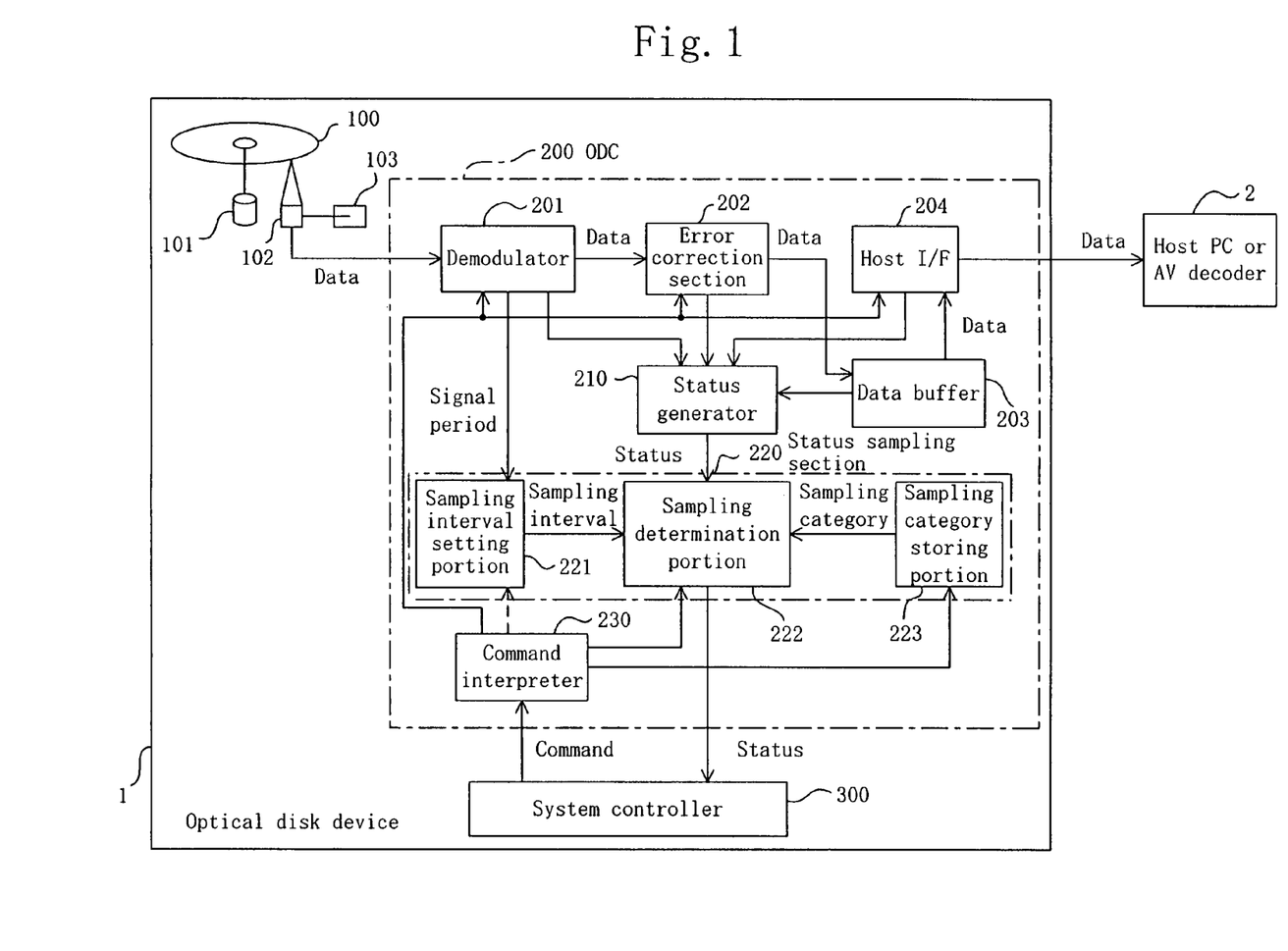
FIG. 1 is a view showing the construction of an optical disk device including an optical disk controller of the present invention.

FIG. 1 illustrates an optical disk device 1 including an optical disk controller of an embodiment according to the present invention. Referring to FIG. 1, the optical disk device 1 includes a spindle motor 101 for rotating an optical disk 100; a pickup 102 for reading data written on the optical disk 100; and a servo 103 for positioning the pickup 102. An optical disk controller (ODC) 200 performs signal processing for the optical disk 100. A system controller 300 controls the entire optical disk device. A host PC or AV decoder 2 sends a command to the optical disk device 1 and receives data from the optical disk device 1.

The internal construction of the optical disk controller 200 will be described. The optical disk controller 200 may be implemented as LSI, for example.

A demodulator 201 demodulates a signal read from the optical disk 100. An error correction section 202 corrects error data included in the data demodulated by the demodulator 201. The error-corrected data is temporarily stored in a data buffer 203. The data stored in the data buffer 203 is output to the host PC or AV decoder 2 via a host interface 204. The demodulator 201, the error correction section 202, and the host interface 204 are implemented by hardware, for example. The data buffer 203 is implemented by DRAM, for example.

A status generator 210 generates a code, i.e., a status report, indicating the operation state of the optical disk controller 200. A status sampling section 220 samples status reports generated by the status generator 210 and outputs sampled status reports to the system controller 300. A command interpreter 230 as an assigning means interprets commands sent from the system controller 300 and controls activation of the demodulator 201 and the like, for example. The status generator 210, the status sampling section 220, and the command interpreter 230 are implemented by a combination of a microcomputer and a program, for example.

The status sampling section 220 includes a sampling interval setting portion 221, a sampling determination portion 222, and a sampling category storing portion 223. The sampling interval setting portion 221 sets the sampling interval of status reports and holds the set sampling interval. In this embodiment, the rotational speed of the optical disk 100 is obtained from the synchronization period of the signal demodulated by the demodulator 201, and the sampling interval is set according to the obtained rotational speed. The sampling category storing portion 223 stores, as sampling category information, categories for "sampling abort" status indicating that the sampling should be aborted, "forced sampling" status indicating that the status report should be forcibly sampled even when it is otherwise to be omitted, and the like. The sampling determination portion 222 determines whether or not a given status report should be sampled based on the sampling interval held in the sampling interval setting portion 221 and the sampling category information stored in the sampling category storing portion 223.

Figure 2:
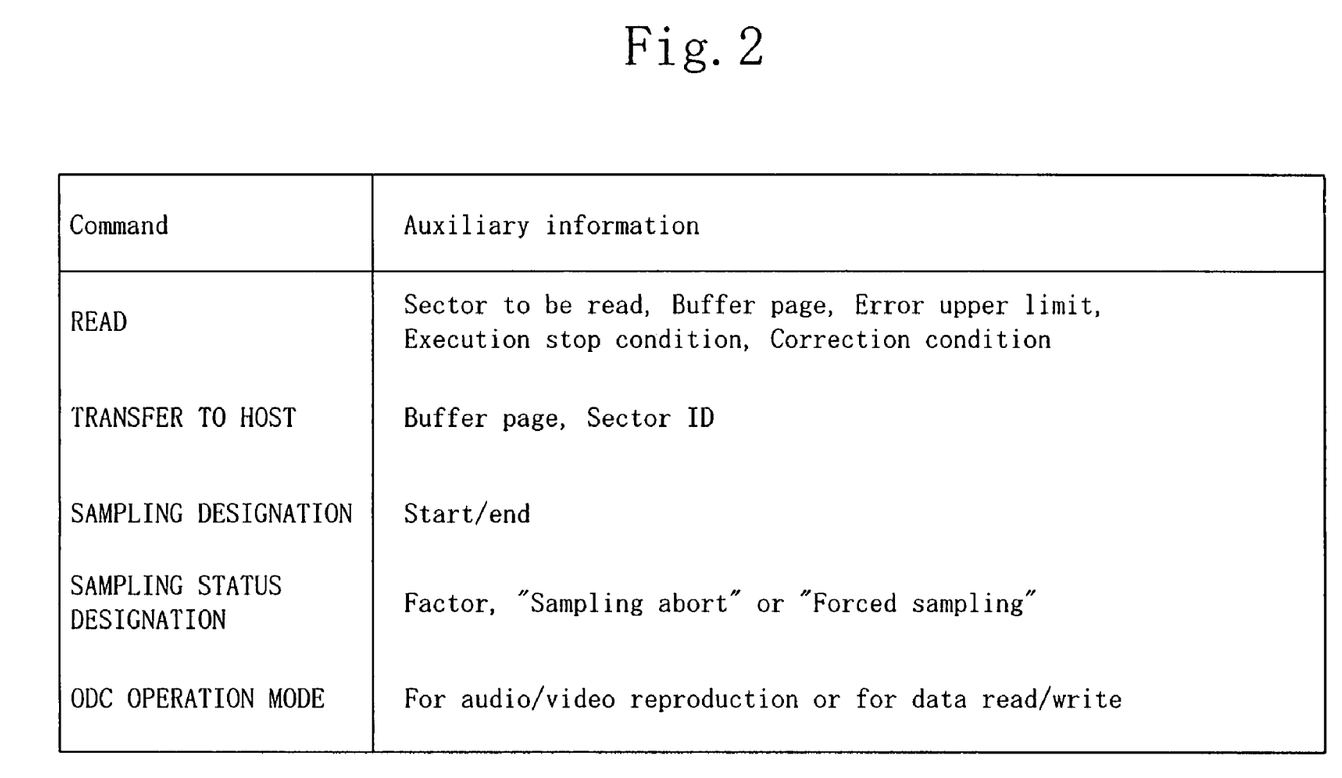
FIG. 2 shows commands acceptable by the optical disk controller in FIG. 1.

FIG. 2 shows commands acceptable by the command interpreter 230 of the optical disk controller 200. It is assumed in this embodiment that commands READ (read a sector), TRANSFER TO HOST (data transfer to host PC or AV decoder), SAMPLING DESIGNATION (sampling start/end), SAMPLING STATUS DESIGNATION (setting of sampling category information), and ODC OPERATION MODE are acceptable.

Figure 3A:
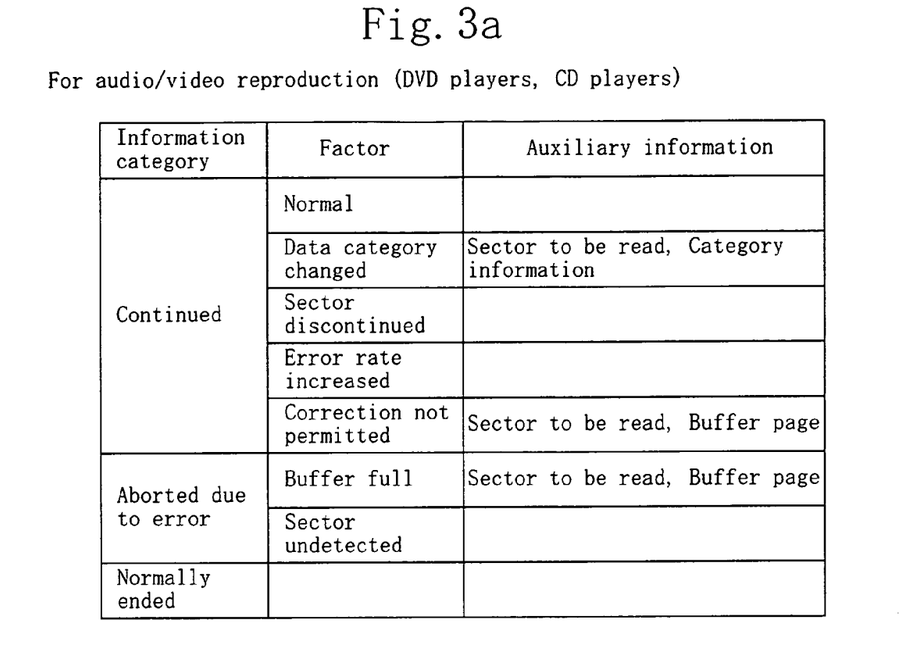
FIGS. 3a and 3b show examples of status reports generated by the optical disk controller in FIG. 1.
Figure 3B:
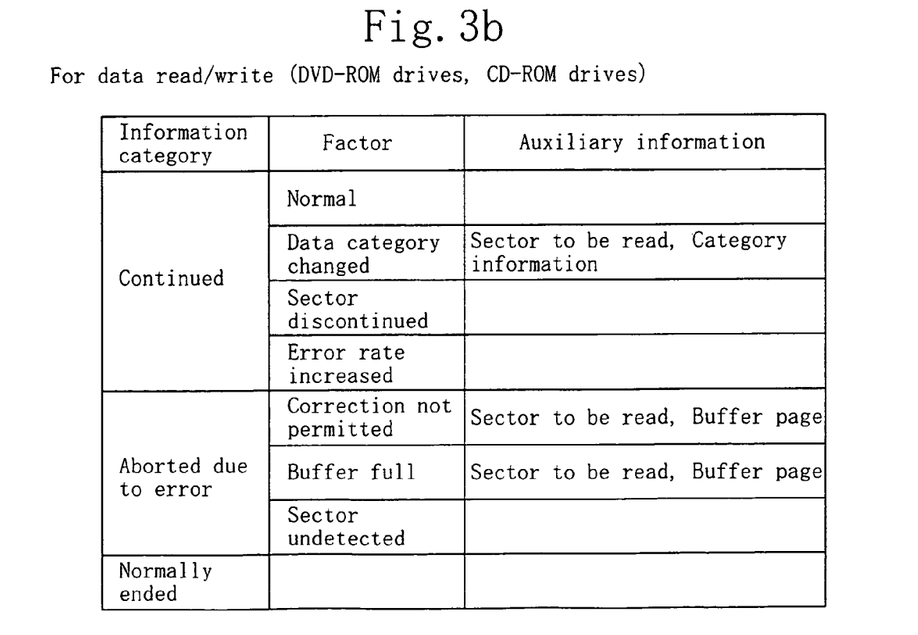

FIGS. 3(a) and 3(b) show examples of status reports generated by the status generator 210: FIG. 3(a) shows status reports for video/audio reproduction, concretely, for DVD players and CD players, for example, and FIG. 3(b) for data read/write, concretely, for DVD-ROM drives and CD-ROM drives, for example. As shown in FIGS. 3(a) and 3(b), the information category includes "continued", "aborted due to error", and "normally ended". The factor includes "normal", "data category changed", "sector discontinued", "error rate increased", "correction not permitted", "buffer full", and the like. The auxiliary information includes the sector ID to be read, the buffer page number, and the like.

The factor "correction not permitted" corresponds to the category "continued" for video/audio reproduction while it corresponds to the category "aborted due to error" for data read/write. This is because, for video/audio application, reproduction should preferably be continued without interruption even if a signal includes some noise. On the contrary, for data application, data including an error is of no use.

It is also assumed in this embodiment that the status report is output every sector and that error correction is made every sector.

Figure 4:
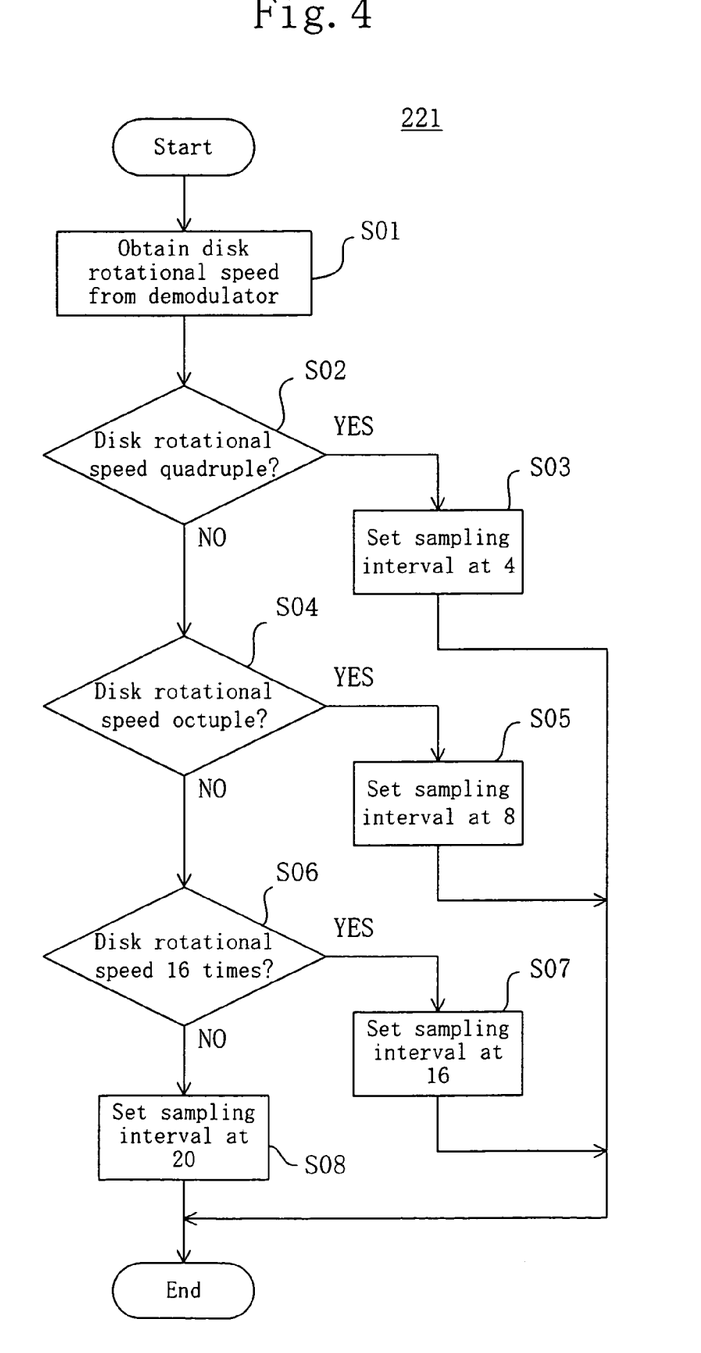
FIG. 4 shows a flowchart of the operation of a sampling interval setting portion shown in FIG. 1.

FIG. 4 is a flowchart showing the operation of the sampling interval setting portion 221. The processing at each step shown in FIG. 4 is as follows.

Step S01: Obtain the rotational speed of the disk (expressed by double speed) according to the synchronization period of a demodulated signal output from the demodulator 201.

Step S02: Proceed to step S03 if the rotational speed is quadruple or lower, or otherwise proceed to step S04.

Step S03: Set the sampling interval at "4" (that is, one every four status reports is output; this is also applicable to the subsequent values of sampling interval), and terminate the operation.

Step S04: Proceed to step S05 if the rotational speed is octuple or lower, or otherwise proceed to step S06.

Step S05: Set the sampling interval at "8" and terminate the operation.

Step S06: Proceed to step S07 if the rotational speed is 16 times or lower, or otherwise proceed to step S08.

Step S07: Set the sampling interval at "16" and terminate the operation.

Step S08: Set the sampling interval at "20" and terminate the operation.

Figure 5:
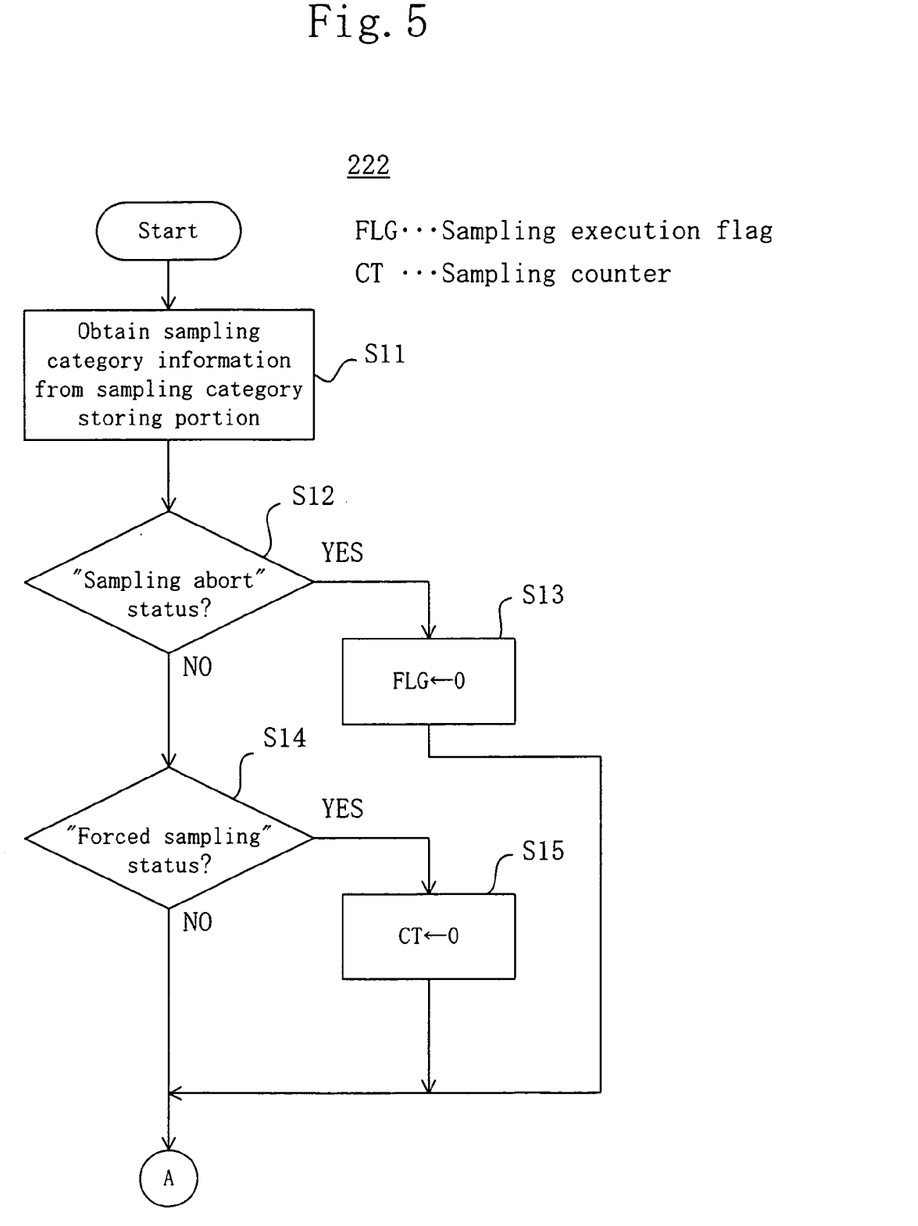
FIGS. 5 and 6 show a flowchart of the operation of a sampling determination portion shown in FIG. 1.
Figure 6:
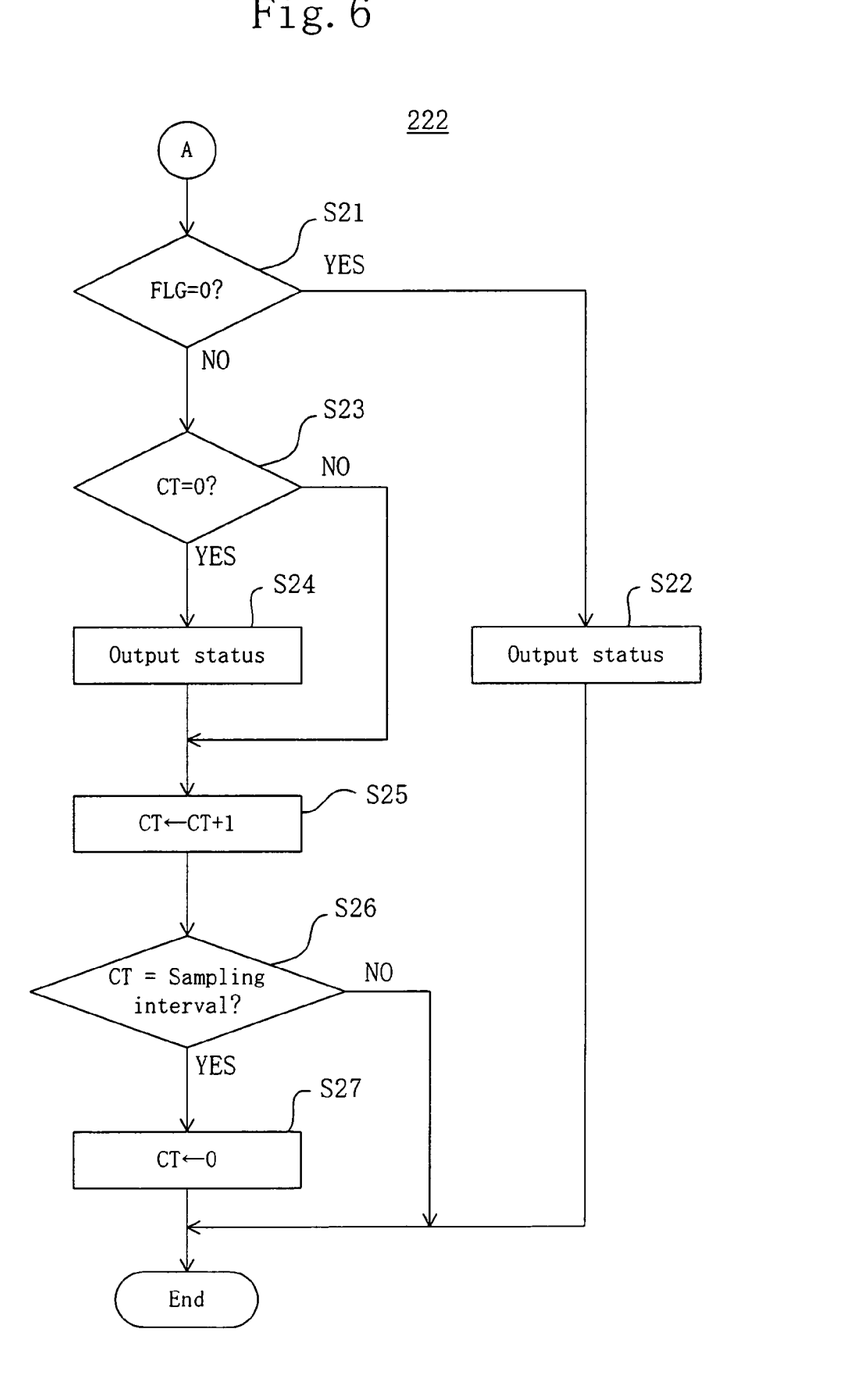

FIGS. 5 and 6 are a flowchart showing the operation of the sampling determination portion 222. The processing at each step shown in FIG. 5 is as follows.

Step S11: Obtain sampling category information from the sampling category storing portion 223.

Step S12: Determine whether or not the status report generated by the status generator 210 corresponds to "sampling abort" status. If yes, proceed to step S13. Otherwise, proceed to step S14.

Step S13: Set a sampling execution flag FLG at "0" and proceed to step S21 (FIG. 6).

Step S14: Determine whether or not the status report generated by the status generator 210 corresponds to "forced sampling" status. If yes, proceed to step S15. Otherwise, proceed to step S21.

Step S15: Set a sampling counter CT at "0" and proceed to step S21.

The processing at each step shown in FIG. 6 is as follows.

Step S21: Determine whether or not the sampling execution flag FLG is "0". If "0", proceed to step S22 for aborting the status sampling. If not, proceed to step S23 for executing status sampling.

Step S22: Output the status report generated by the status generator 210 to the system controller 300 and terminate the operation.

Step S23: Determine whether or not the sampling counter CT is "0". If "0", proceed to step S24 since the current status report generated by the status generator 210 should be output. If not, proceed to step S25 since the current status report should be omitted.

Step S24: Output the current status report generated by the status generator 210 to the system controller 300.

Step S25: Increment the value of the sampling counter CT by "1"

Step S26: Compare the value of the sampling counter CT with the sampling interval received from the sampling interval setting portion 221. If these values match with each other, proceed to step S27. If not, that is, if the value of the sampling counter CT has not reached the sampling interval, terminate the operation.

Step S27: Set the sampling counter CT at "0".

Figure 7:
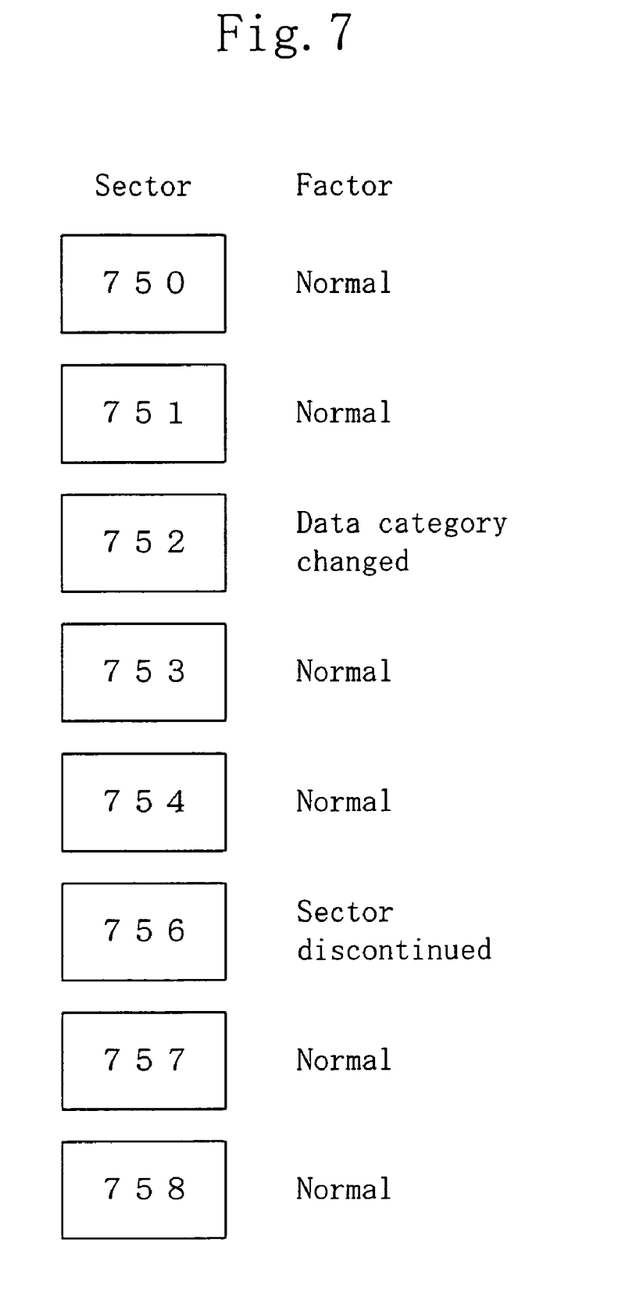
FIG. 7 shows an example of sector arrangement of an optical disk.

Hereinafter, the operation of the optical disk controller of this embodiment with the above construction will be described in a concrete manner. Assume herein that the optical disk 100 has a sector arrangement as shown in FIG. 7. That is, as is seen from FIG. 7, the data category has changed in sector 752 and sector discontinuation has occurred in sector 756.

The host PC or AV decoder 2 sends a command to the optical disk device 1 requesting to read data from the optical disk 100. The command is received by the system controller 300 via the host interface 204.

The system controller 300 issues command SAMPLING VALID to the command interpreter 230. The system controller 300 also issues command STATUS CONDITIONS to the command interpreter 230, in which "sampling abort" is set for a status report having the factor "sector discontinued", and "sampling target" is set for a status report having the factor "correction not permitted" or "error rate increased". The system controller 300 further issues command ODC OPERATION MODE: FOR VIDEO/AUDIO REPRODUCTION to the command interpreter 230.

The system controller 300 then instructs the spindle motor 101 to rotate the optical disk 100 and the servo 103 to move the pickup 102 to a target sector.

On receipt of the command SAMPLING VALID, the command interpreter 230 sets the sampling execution flag FLG of the sampling determination portion 222 of the status sampling section 220 at "1". A signal read by the pickup 102 is sent to the demodulator 201, which measures the period of one sector and determines the rotational speed as octuple. On receipt of the information from the demodulator 201 that the rotational speed of the disk 100 is octuple, the sampling interval setting portion 221 sets the sampling interval at "8".

Figure 8:
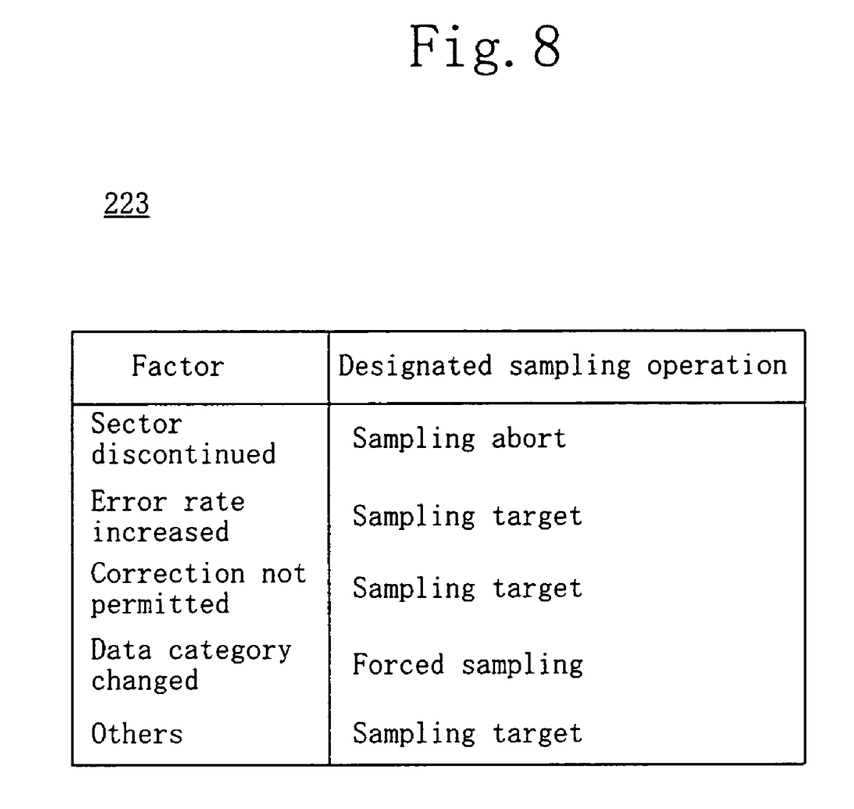
FIG. 8 shows an example of sampling category information stored in a sampling category storing portion shown in FIG. 1.

On receipt of the command STATUS CONDITIONS, the command interpreter 230 sets sampling category information and stores the results in the sampling category storing portion 223. Stored in the sampling category storing portion 223 is sampling category information as shown in FIG. 8 in this embodiment, which represents the relationship between the factor in the status report and the corresponding sampling operation. Concretely, "sampling abort" is designated for the factor "sector discontinued", "sampling target" is designated for the factors "error rate increased" and "correction not permitted", and "forced sampling" is designated for the factor "data category changed". For the other factors, "sampling target" is designated.

The system controller 300 issues command READ: SECTOR TO BE READ (750), BUFFER PAGE (10) to the command interpreter 230.

On receipt of the command READ, the command interpreter 230 instructs the demodulator 201 to start reading data from sector 750. The demodulator 201 monitors data sent from the pickup 102 and, when recognizing sector 750, sends data of this sector to the error correction section 202.

The error correction section 202 executes error correction for the data output from the demodulator 201, and outputs the error correction results to the status generator 210. Recognizing that sector 750 has been normally error-corrected, the status generator 210 generates the status report "continued/normal/sector: 750" for sector 750.

On receipt of the status report for sector 750, "continued/normal/sector: 750", generated by the status generator 210, the sampling determination portion 222 operates according to the flowchart shown in FIGS. 5 and 6.

First, the sampling determination portion 222 retrieves the sampling category information representing the relationship between the factor in the status report and the corresponding sampling operation, from the sampling category storing portion 223 (step S11). Since the status "continued/normal/sector: 750" is not "sampling abort" status, that is, does not have the factor "sector discontinued" (step S12), the process proceeds to step S14. Since the status "continued/normal/sector: 750" is "sampling target" status (step S14), the process proceeds to step S21.

At step S21, since the sampling execution flag FLG is "1" indicating that sampling is to be executed, the process proceeds to step S23. At step S23, since the sampling counter CT is "0" indicating that the status report is to be output, the status report "continued/normal/sector: 750" is output to the system controller 300. At step S25, the value of the sampling counter CT is incremented by "1". At step S26, the value of the sampling counter CT is compared with the sampling interval ("8" in this embodiment) received from the sampling interval setting portion 221. Since the value of the sampling counter CT is "1", which is smaller than the sampling interval, the operation is terminated.

Next, sector 751 is read. On receipt of the status report for sector 751 "continued/normal/sector: 751" generated by the status generator 210, the sampling determination portion 222 operates according to the flowchart shown in FIGS. 5 and 6. The status "continued/normal/sector: 751" is determined as "sampling target" status, and the value of the sampling counter CT is "1". Therefore, sampling of this status report is omitted.

Sector 752 is then read. The error correction section 202 executes error correction for data output from the demodulator 201, and outputs the error correction results to the status generator 210. Being informed of a change in data category by the data buffer 204, the status generator 210 generates the status report "sector: 752/data category changed" for sector 752.

On receipt of the status report for sector 752 "sector: 752/data category changed" generated by the status generator 210, the sampling determination portion 222 operates according to the flowchart shown in FIGS. 5 and 6.

First, the sampling determination portion 222 retrieves the sampling category information representing the relationship between the factor in the status report and the corresponding designated sampling operation from the sampling category storing portion 223 (step S11). Since the status "sector: 752/data category changed" is not "sampling abort" status, that is, does not have the factor "sector discontinued" (step S12), the process proceeds to step S14. Since the status "sector: 752/data category changed" is "forced sampling" status, the value of the sampling counter CT is set at "0" at step S15.

At step S21, since the sampling execution flag FLG is "1" indicating that sampling is to be executed, the process proceeds to step S23. At step S23, since the sampling counter is "0" indicating that the status report is to be output, the status report "sector: 752/data category changed" is output to the system controller 300. At step S25, the value of the sampling counter CT is incremented by "1". At step S26, the value of the sampling counter CT is compared with the sampling interval ("8" in this embodiment) received from the sampling interval setting portion 221. Since the value of the sampling counter CT is "1", which is smaller than the sampling interval, the operation is terminated.

On receipt of the status "sector: 752/data category changed" from the status sampling section 220, the system controller 300 determines whether the read operation be continued or aborted. Assume in this case that the read operation is continued.

Next, sector 753 is read. The sampling determination portion 222 receives the status report for sector 753 "continued/normal/sector: 753" generated by the status generator 210. This status is determined as "sampling target", and the value of the sampling counter CT is "1". Therefore, sampling of this status report is omitted. Subsequently, sector 754 is read. The sampling determination portion 222 receives the status report for sector 754 "continued/normal/sector: 754" generated by the status generator 210. This status is determined as "sampling target", and the value of the sampling counter CT is "2". Therefore, sampling of this status is omitted.

Sector 755 is then attempted to be read but found missing. The demodulator 201 therefore determines as "sector discontinued", and proceeds to read the next sector 756. The status generator 210 is informed of the "sector discontinued" by the demodulator 201, and generates the status report "sector: 756/sector discontinued" representing that sector 756 is "sector discontinued".

On receipt of the status "sector: 756/sector discontinued" generated by the status generator 210, the sampling determination portion 222 operates according to the flowchart shown in FIGS. 5 and 6.

First, the sampling determination portion 222 retrieves the sampling category information representing the relationship between the factor in the status report and the corresponding designated sampling operation from the sampling category storing portion 223 (step S11). Since the status "sector: 756/status discontinued" is "sampling abort" status, that is, has the factor "sector discontinued"(step S12), the process proceeds to step S13. At step S13, the sampling execution flag FLG is set at "0", and process proceeds to step S21.

At step S21, since the sampling execution flag FLG is "0", it is determined that the sampling is aborted. The status report "sector: 756/status discontinued" is output to the system controller 300 (step S22), and the operation is terminated.

At the above point, the sampling execution flag FLG was set at "0"indicating that the status sampling is aborted. Therefore, this status report "sector: 756/status discontinued" and all the subsequent status reports are sent to the system controller 300 without sampling. That is, as for sectors 757 and 758 to be subsequently read, generated status reports are output without sampling.

Figure 9:
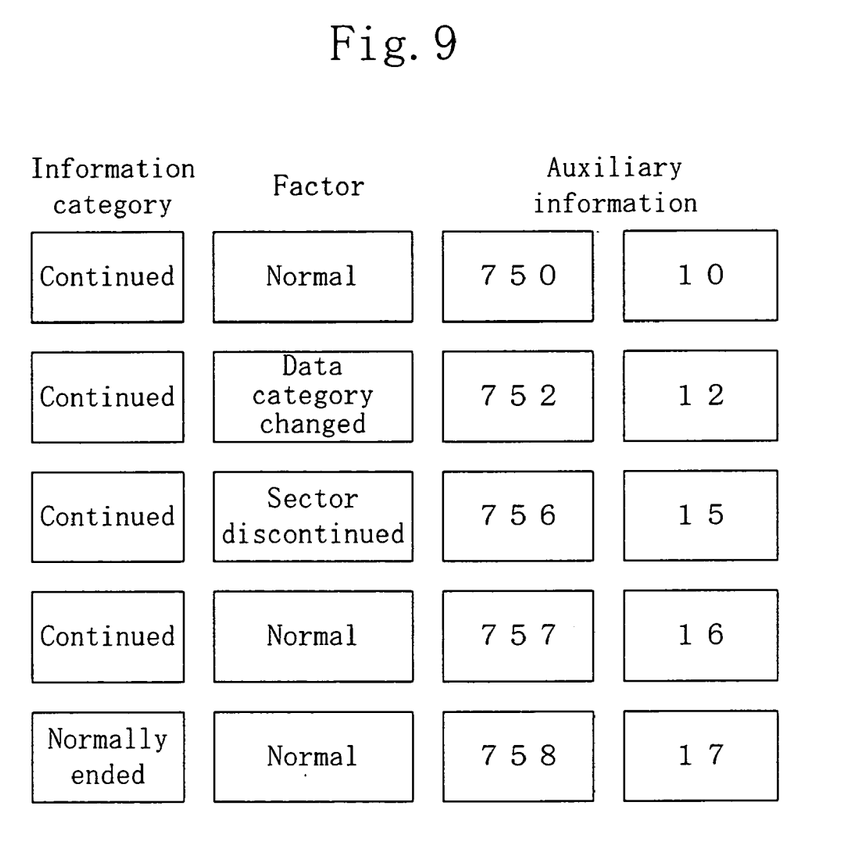
FIG. 9 shows an example of status report sampling results according to the present invention.

FIG. 9 shows the results of the above sampling. The system controller 300 has received only the status reports shown in FIG. 9. In other words, the status reports for sectors 751, 753, and 754 were omitted in the sampling. The status report for sector 752 which would have otherwise been omitted was output because it had the factor "data category changed". Also, since sector 755 was missing, the status report for sector 756 that had the factor "sector discontinued" was determined as "sampling abort" status. By this determination, all the status reports for sector 756 and the subsequent sectors were output.

Thus, as described above, the optical disk controller 200 executes sampling of status reports to be output to the system controller 300 while selectively outputting important information during the sampling. This reduces the data amount of status reports the system controller 300 must handle individually to provide determination. Therefore, the number of status reports is prevented from simply increasing when the rotational speed of the optical disk 100 is enhanced, as in the conventional case. As a result, the burden of the system controller 300 is relieved.

In the above embodiment, the status report was generated on the premise that one error correction corresponds to one sector. The present invention is also applicable to other cases, for example, the case where one error correction corresponds to 16 sectors.

In the above embodiment, the sampling interval setting portion 221 set the sampling interval according to the synchronization period of a signal read from the optical disk 100. The setting of the sampling interval may also be made in other ways. For example, the sampling interval may be set according to the error rate of a signal read from the optical disk 100. Alternatively, the command interpreter 230 as an assigning means may specify the sampling interval according to a command supplied from the system controller 300.

In the above embodiment, the command interpreter 230 as an assigning means set the sampling category information representing the relationship between the factor in the status report and the corresponding sampling operation according to a command from the system controller 300, and stored it in the sampling category storing portion 223. The sampling category information stored in the sampling category storing portion 223 may further be updated according to the synchronization period, the error rate and so forth of a signal demodulated from the optical disk 100.

In place of the sampling category information representing the relationship between the factor in the status report and the sampling operation, the categories of "sampling abort" status and "forced sampling" status may be stored in the sampling category storing portion 223.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. An optical disk controller for performing signal processing for an optical disk, comprising:
    an error correcting section for performing error correction for data read from the optical disk and outputting an error correction result;
    a status generator for generating status reports based on the error correction result outputted by the error correcting section, each representing the operation state of the optical disk controller; and
    a status sampling section for selectively sampling the status reports, said status sampling section comprises a sampling interval setting portion for setting a status sampling interval, wherein the sampling interval setting portion sets the sampling interval according to the rotational speed of the optical disk.

2. The optical disk controller of claim 1, wherein the sampling interval setting portion determines the rotational speed of the optical disk according to a synchronization period of a signal demodulated from the optical disk.

3. The optical disk controller of claim 1, further comprising assigning means for allowing the sampling interval setting portion to set the sampling interval according to a command input externally.

4. The optical disk controller of claim 1, wherein the sampling interval setting portion sets the sampling interval according to an error rate of a signal demodulated from the optical disk.

5. The optical disk controller of claim 1, wherein the status sampling section comprises a sampling category storing portion that stores "sampling abort" status indicating that sampling operation should be aborted, and
    when the status report generated by the status generator matches with the "sampling abort" status stored in the sampling category storing portion, the sampling is discontinued.

6. The optical disk controller of claim 1, wherein the status sampling section comprises a sampling category storing portion that stores "forced sampling" status indicating that the status report should be forcibly output even during sampling operation, and
    when the status report generated by the status generator matches with the "forced sampling" status stored in the sampling category storing portion, the status is output even during sampling operation.

7. The optical disk controller of claim 5 or 6, further comprising assigning means for setting sampling category information representing the relationship between a factor in the status report and sampling operation and storing the sampling category information in the sampling category storing portion.

8. The optical disk controller of claim 7, wherein the status sampling section updates the sampling category information stored in the sampling category storing portion according to a signal demodulated from the optical disk.

9. An optical disk device comprising an optical disk controller, said optical disk controller comprising:
    an error correcting section for performing error correction for data read from the optical disk and outputting an error correction result;
    a status generator for generating status reports based on the error correction result output from the error correcting section, each representing the operation state of the optical disk controller; and
    a status sampling section for selectively sampling the status reports, said status sampling section comprises a sampling interval setting portion for setting a status sampling interval, wherein the sampling interval setting portion sets the sampling interval according to the rotational speed of the optical disk.

10. The optical disk device of claim 9, further comprising a system controller for controlling an operation of the optical disk controller in reference to the status reports outputted by the status sampling section.

11. An optical disk controller for performing signal processing for an optical disk, comprising:
    a status generator for generating status reports each representing the operation state of the optical disk controller; and
    a status sampling section for selectively sampling the status reports,
    wherein the status sampling section comprises a sampling interval setting portion for setting a status sampling interval, and
    wherein the sampling interval setting portion sets the sampling interval according to the rotational speed of the optical disk.

12. The optical disk controller of claim 11, wherein the sampling interval setting portion determines the rotational speed of the optical disk according to a synchronization period of a signal demodulated from the optical disk.

* * * * *